(12) United States Patent
Donovan

(10) Patent No.: US 9,577,933 B2
(45) Date of Patent: *Feb. 21, 2017

(54) METHOD AND SYSTEM OF PROVIDING DIFFERENTIATED SERVICES

(75) Inventor: Steven R. Donovan, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1130 days.

This patent is subject to a terminal disclaimer.

(21) Appl. No.: 12/391,700

(22) Filed: Feb. 24, 2009

(65) Prior Publication Data

US 2009/0154468 A1    Jun. 18, 2009

Related U.S. Application Data

(63) Continuation of application No. 11/130,317, filed on May 16, 2005, now Pat. No. 7,830,888, which is a
(Continued)

(51) Int. Cl.
*H04L 12/801* (2013.01)
*H04L 29/08* (2006.01)
(Continued)

(52) U.S. Cl.
CPC ........... *H04L 47/10* (2013.01); *H04L 12/5695* (2013.01); *H04L 29/06* (2013.01); *H04L 47/15* (2013.01); *H04L 47/2408* (2013.01); *H04L 47/782* (2013.01); *H04L 47/801* (2013.01); *H04L 63/08* (2013.01); *H04L 65/1006* (2013.01); *H04L 65/1069* (2013.01); *H04L 65/80* (2013.01); *H04L 67/14* (2013.01); *H04Q 3/0025* (2013.01); *H04L 29/06027* (2013.01);
(Continued)

(58) Field of Classification Search
None
See application file for complete search history.

(56) References Cited

U.S. PATENT DOCUMENTS 5,130,983 A    7/1992   Heffner
5,315,586 A    5/1994   Charvillat
(Continued)

FOREIGN PATENT DOCUMENTS

WO    2000/030295    5/2000

OTHER PUBLICATIONS

"IPHighway Product Overview", "IPHighway Product Overview," http://iphighway.com/prod/, pp. 1-4, Sep. 22, 1999.
(Continued)

*Primary Examiner* — Faruk Hamza
*Assistant Examiner* — Cassandra Decker

(57) ABSTRACT

A method for combining Internet protocols in a Differentiated Services model environment is described. The Session Initiation Protocol (SIP) and Common Open Policy Service (COPS) are combined together to provide methods of setting up a session and tearing down a session, while maintaining Authentication, Authorization, and Accounting (AAA) policies. The Open Settlement Policy (OSP) is also combined with SIP and COPS. This combination provides for an interchange of parameters between session setup, teardown, authorization, policy, Quality of Service (QoS), and usage reporting

17 Claims, 5 Drawing Sheets

Related U.S. Application Data continuation of application No. 09/435,540, filed on Nov. 8, 1999, now Pat. No. 6,970,930.

(60) Provisional application No. 60/163,913, filed on Nov. 5, 1999.

(51) Int. Cl.
- H04L 29/06 (2006.01)
- H04L 12/911 (2013.01)
- H04L 12/54 (2013.01)
- H04L 12/851 (2013.01)
- H04L 12/927 (2013.01)
- H04Q 3/00 (2006.01)

(52) U.S. Cl.
CPC .. H04L 69/329 (2013.01); H04Q 2213/13034 (2013.01); H04Q 2213/13166 (2013.01); H04Q 2213/13204 (2013.01); H04Q 2213/13348 (2013.01); H04Q 2213/13389 (2013.01)

(56) References Cited

U.S. PATENT DOCUMENTS

| | | |
|---|---|---|
| 5,586,121 A | 12/1996 | Moura et al. |
| 5,634,012 A | 5/1997 | Stefik et al. |
| 5,680,116 A | 10/1997 | Hashimoto et al. |
| 5,745,694 A | 4/1998 | Egawa et al. |
| 5,825,772 A | 10/1998 | Dobbins et al. |
| 5,867,571 A | 2/1999 | Borchering |
| 5,883,894 A | 3/1999 | Patel et al. |
| 5,889,777 A | 3/1999 | Miyao et al. |
| 5,903,559 A | 5/1999 | Acharya et al. |
| 5,903,735 A | 5/1999 | Kidder et al. |
| 5,909,430 A | 6/1999 | Reaves |
| 5,930,348 A | 7/1999 | Regnier et al. |
| 5,933,412 A | 8/1999 | Choudhury et al. |
| 5,953,338 A | 9/1999 | Ma et al. |
| 5,960,416 A | 9/1999 | Block |
| 5,991,292 A | 11/1999 | Focsaneanu et al. |
| 6,058,113 A | 5/2000 | Chang |
| 6,073,160 A | 6/2000 | Grantham et al. |
| 6,088,358 A | 7/2000 | Tomita et al. |
| 6,097,722 A | 8/2000 | Graham et al. |
| 6,108,314 A | 8/2000 | Jones et al. |
| 6,137,777 A | 10/2000 | Vaid et al. |
| 6,141,686 A | 10/2000 | Jackowski et al. |
| 6,151,319 A | 11/2000 | Dommety et al. |
| 6,157,648 A | 12/2000 | Voit et al. |
| 6,167,445 A * | 12/2000 | Gai et al. ............ 709/223 |
| 6,195,355 B1 | 2/2001 | Demizu |
| 6,205,148 B1 | 3/2001 | Takahashi et al. |
| 6,216,006 B1 | 4/2001 | Scholefield et al. |
| 6,295,532 B1 | 9/2001 | Hawkinson |
| 6,298,383 B1 | 10/2001 | Gutman et al. |
| 6,324,279 B1 | 11/2001 | Kalmanek et al. |
| 6,343,326 B2 | 1/2002 | Acharya et al. |
| 6,366,577 B1 | 4/2002 | Donovan |
| 6,385,203 B2 | 5/2002 | McHale et al. |
| 6,426,955 B1 | 7/2002 | Gossett Dalton et al. |
| 6,434,153 B1 | 8/2002 | Yazaki et al. |
| 6,473,404 B1 | 10/2002 | Kaplan et al. |
| 6,487,170 B1 | 11/2002 | Chen et al. |
| 6,539,431 B1 * | 3/2003 | Sitaraman et al. ........... 709/226 |
| 6,578,076 B1 | 6/2003 | Putzolu |
| 6,581,102 B1 | 6/2003 | Amini et al. |
| 6,584,093 B1 | 6/2003 | Salama et al. |
| 6,594,277 B1 | 7/2003 | Chiang et al. |
| 6,678,264 B1 * | 1/2004 | Gibson ............ 370/352 |
| 6,678,835 B1 | 1/2004 | Shah et al. |
| 6,708,034 B1 | 3/2004 | Sen et al. |
| 6,714,515 B1 | 3/2004 | Marchand |
| 6,714,987 B1 | 3/2004 | Amin et al. |
| 6,728,365 B1 | 4/2004 | Li et al. |
| 6,735,630 B1 | 5/2004 | Gelvin et al. |
| 6,745,207 B2 | 6/2004 | Reuter et al. |
| 6,765,927 B1 | 7/2004 | Martin et al. |
| 6,775,701 B1 | 8/2004 | Pan et al. |
| 6,801,542 B1 | 10/2004 | Subbiah |
| 6,801,940 B1 | 10/2004 | Moran et al. |
| 6,823,385 B2 | 11/2004 | McKinnon et al. |
| 6,826,613 B1 | 11/2004 | Wang et al. |
| 6,829,221 B1 | 12/2004 | Winckles et al. |
| 6,845,106 B2 | 1/2005 | McKinnon et al. |
| 6,854,014 B1 | 2/2005 | Amin et al. |
| 6,857,012 B2 | 2/2005 | Sim et al. |
| 6,914,883 B2 | 7/2005 | Dharanikota |
| 6,917,617 B2 * | 7/2005 | Jin et al. ............ 370/395.21 |
| 6,973,035 B2 | 12/2005 | Seddigh et al. |
| 7,046,680 B1 | 5/2006 | McDysan et al. |
| 7,069,337 B2 | 6/2006 | Rawlins et al. |
| 7,146,425 B2 | 12/2006 | Oottamakorn et al. |
| 7,212,495 B2 | 5/2007 | Karri et al. |
| 7,307,954 B1 | 12/2007 | Strandberg et al. |
| 2001/0025310 A1 | 9/2001 | Krishnamurthy et al. |
| 2001/0027490 A1 | 10/2001 | Fodor et al. |
| 2001/0048682 A1 | 12/2001 | Fichou et al. |
| 2002/0016839 A1 | 2/2002 | Smith et al. |
| 2002/0026513 A1 | 2/2002 | Hoglund et al. |
| 2003/0018760 A1 * | 1/2003 | Putzolu et al. ............ 709/223 |
| 2004/0022191 A1 | 2/2004 | Bernet et al. |

OTHER PUBLICATIONS

Arao, Shinya, et al., "Component-based policy deployment for service level differentiation in converging communication networks".

Balmer, et al., "A Concept for RSVP Over DiffServ", Balmer, et al., "A Concept for RSVP Over DiffServ," Ninth International Conference on Computer Communications and Networks, pp. 412-417, Oct. 16-18, 2000.

Beck, et al., "Scheduling Alternative Activities", American Association for Artificial Intelligence, 1999.

Bernet, et al., "A Framework for Differentiated Services-draft-ietf-diffserv-framework-02.txt", Bernet, et al., "A Framework for Differentiated Services-draft-ieff-diffserv-framework-02.txt," The Internet Society, 35 pages, Feb. 1999.

Bernet, et al., "A Framework for Integrated Services Operation Over Diffserv Networks—RFC 2998", Bernet, et al., "A Framework for Integrated Services Operation Over Diffserv Networks—RFC 2998," Network Working Group, The Internet Society, 29 pages, Nov. 2000.

Bernet, "The Complementary Roles of RSVP and Differentiated Services in the Full-Service QoS Network", Bernet, et al., "The Complementary Roles of RSVP and Differentiated Services in the Full-Service QoS Network," IEEE Communications Magazine, vol. 38, Issue 2, pp. 154-162, Feb. 2000.

Blake, et al., "An Architecture for Differentiated Services—RFC 2475", Blake, et al, "An Architecture for Differentiated Services—RFC 2475," Network Working Group, The Internet Society, 31 pages, Dec. 1998.

Boyle, et al., "COPS Usage for RSVP", Boyle, et al., "COPS Usage for RSVP, draft-ietf-rap-cops-rsvp-05.txt," Internet Engineering Task Force (IETF), pp. 1-15, Jun. 14, 1999.

Boyle, et al., "The COPS (Common Open Policy Service) Protocol, draft-ieff-rap-cops07-txt", Boyle, et al., "The COPS (Common Open Policy Service) Protocol, draft-ieff-rap-cops07-txt," Internet Engineering Task Force (IETF), pp. 1-33, Aug. 16, 1999.

Braden, et al., "Integrated Services in the Internet Architecture: An Overview—RFC 1633", Braden, et al., "Integrated Services in the Internet Architecture: An Overview—RFC 1633," Network Working Group, The Internet Society, 31 pages, Jun. 1994.

Braden, et al., "Resource ReSerVation Protocol (RSVP)—Version 1 Functional Specification, RFC 2205", Braden, et al., "Resource ReSerVation Protocol (RSVP)—Version 1 Functional Specification, RFC 2205," Network Working Group, 99 pages, Sep. 1997.

Braden, et al., "Resource ReSerVation Protocol (RSVP), Version 1 Functional Specification—RFC 2205", Braden, et al., "Resource

(56) References Cited

OTHER PUBLICATIONS

ReSerVation Protocol (RSVP), Version 1 Functional Specification—RFC 2205," Network Working Group, The Internet Society, 105 pages, Sep. 1997.
Braun, "Internet Protocols for Multimedia Communications, Part II: Resource Reservation, Transport, and Application Protocols", Braun, "Internet Protocols for Multimedia Communications, Part II: Resource Reservation, Transport, and Application Protocols," IEEE MultiMedia, pp. 74-82, vol. 4, Issue 4, Oct. 1997.
Brazilai, et al., "Design and Implementation of an RSVP-based Quality of Service Architecture for Integrated Services Internet", Brazilai, et al., "Design and Implementation of an RSVP-based Quality of Service Architecture for Integrated Services Internet," Proceedings of the 17th International Conference on Distributed Computing Systems, pp. 543-551, May 27-30, 1997.
Detti, et al., "Supporting RSVP in Differentiated Service Domain: an Architectural Framework and a Scalability Analysis", Detti, et al., "Supporting RSVP in Differentiated Service Domain: An Architectural Framework and a Scalability Analysis," IEEE International Conference on Communications (ICC '99), vol. 1, pp. 204-210, Jun. 6-10, 1999.
Ekstein, et al., "AAA Protocols: Comparison between RADIUS, DIAMETER and COPS, draft-ekstein-roamops-protcomp-00.txt", Ekstein, et al., "AAA Protocols: Comparison between RADIUS, DIAMETER and COPS, draft-ekstein-roamops-protcomp-00.txt," ROAMOPS Working Group, Internet Engineering Task Force (IETF), p. 1-17, Aug. 1999.
Eriksson, et al., "SIP Telephony Gateway on DTM", Eriksson, et al., "SIP Telephony Gateway on DTM," The Royal Institute of Technology Sweden, Bachelors Thesis, pp. 1-54, Jul. 2, 1999.
Flykt, et al., "SIP Services and Interworking with Ipv6", Mar. 2001, pp. 186-190.
Gleeson, et al., "A Framework for IP Based Virtual Private Networks—RFC 2764", Gleeson, et al., "A Framework for IP Based Virtual Private Networks—RFC 2764," Network Working Group, The Internet Society, 58 pages, Feb. 2000.
Handley, et al., "SIP: Session Initiation Protocol, RFC 2543", Handley, et al., "SIP: Session Initiation Protocol, RFC 2543," Network Working Group, The Internet Society, 131 pages, Mar. 1999.
Hubaux, et al., "The Impact of the Internet on Telecommunication Architectures", Hubaux, et al., "The Impact of the Internet on Telecommunication Architectures," Computer Networks and ISDN Systems, vol. 31, No. 3, pp. 257-273, Apr. 11, 1999.
Hussmann, et al., "An Edge Device for Supporting Internet Integrated Sevices Over Sswitched ATM Networks", Hussmann, et al, "An Edge Device for Supporting Internet Integrated Services Over Switched ATM Networks," Interoperable Communication Networks, vol. 1, No. 9, pp. 321-330, Sep. 1998.
Kausar, et al., "A Charging Model for Sessions on the Internet", Kausar, et al., "A Charging Model for Sessions on the Internet," Proceedings of the Fourth IEEE Symposium on Computers and Communications, pp. 32-38, Apr. 1999.
Kumar, et al., "Beyond Best Effort: Router Architectures for the Differentiated Services of Tomorrow's Internet", Kumar, et al., "Beyond Best Effort: Router Architectures for the Differentiated Services of Tomorrow's Internet," IEEE communications Magazine, pp. 152-164, May 1998.
Mamais, et al., "Efficient Buffer Management and Scheduling in a Combined IntServ and DiffServ Architecture: A Performance Study", Mamais, et al., "Efficient Buffer Management and Scheduling in a Combined IntServ and DiffServ Architecture: A Performance Study," 2nd International Conference on ATM (ICATM '99), pp. 236-242, Jun. 21-23, 1999.
Mascolo, et al., "An XML Based Programmable Network Platform", Proc. of the ICSE Workshop on Software Engineering and Mobility, Toronto Canada, May 2001.
Neilson, et al., "A Discussion of Bandwidth Broker Requirements for Internet2 Qbone Deployment, Version 0.7", Neilson, et al., "A Discussion of Bandwidth Broker Requirements for Internet2 Qbone Deployment, Version 0.7," Internet2 Qbone BB Advisory Council, pp. 1-30, Aug. 1999.
Nichols, et al., "A Two-bit Differentiated Architecture for the Internet, RFC 2638", Nichols, et al., "A Two-bit Differentiated Architecture for the Internet, RFC 2638," Network Working Group, pp. 1-25, Jul. 1999.
Pan, et al., "Diameter: Policy and Accounting Extension for SIP, draft-pan-diameter-sip-01.txt", Pan, et al., "Diameter: Policy and Accounting Extension for SIP, draft-pan-diameter-sip-01.txt," Internet Engineering Task Force, Internet Draft, 25 pages, Nov. 15, 1998.
Pan, et al., "Diameter: Policy and Accounting Extension for SIP (draft-pan-diameter-sip-01)", Pan, et al., "Diameter: Policy and Accounting Extension for SIP (draft-pan-diameter-sip-01)," Internet Engineering Task Force (IETF), The Internet Society, 20 pages, Nov. 15, 1998.
Roberts, "The New Class System, Comprehensive Approaches Give Net Managers the Power to Prioritize—All the Way Across the Network", Roberts, "The New Class System, Comprehensive Approaches Give Net Managers the Power to Prioritize—All the Way Across the Network," 14 pages, http://www.data.com/roundups/class_system.html, Oct. 1997.
Rosen, et al., "BGP/MPLS VPNs, RFC 2547", Rosen et al., "BGP/MPLS VPNs, RFC 2547," Cisco Systems, Inc., Network Working Group, The Internet Society, pp. 1-25, Mar. 1999.
Rosenberg, et al., "Internet Telephony Gateway Location", Rosenberg, et al., "Internet Telephony Gateway Location," INFOCOM '98. Seventeenth Annual Joint Conference of the IEEE Computer and Communications Societies, pp. 488-496, Mar. 29-Apr. 2, 1998.
Salsano, et al., "QoS Control by Means of COPS to Support SIP-Based Applications", Mar./Apr. 2002, pp. 27-33.
Schulzrinne, "A Comprehensive Multimedia Control Architecture for the Internet", Schulzrinne, et al., "A Comprehensive Multimedia Control Architecture for the Internet," XP000770949, Proceedings of the IEEE 7th International Workshop on Network and Operating System Support for Digital Audio and Video, pp. 65-76, May 19-21, 1997.
Schulzrinne, et al., "Interaction of Call Setup and Resource Reservation Protocols in Internet Telephony", Schulzrinne, et al., "Interaction of Call Setup and Resource Reservation Protocols in Internet Telephony, " pp. 1-13, Jun. 11, 1999.
Schulzrinne, et al., "Signaling for Internet Telephony", Schulzrinne, et al., "Signaling for Internet Telephony," Columbia University, Dept. of Computer Science Technical Report CUCS-005-98, pp. 1-27, Feb. 2, 1998.
Schulzrinne, et al., "Signaling for Internet Telephony", Schulzrinne, et al., "Signaling for Internet Telephony," Columbia University, Dept. of Computer Science Technical Report, CUCS-005-98, pp. 1-27, Jan. 31, 1998.
Sinnreich, et al., "AAA Usage for IP Telephony with QoS, draft-sinnreich-aaa-interdomain-sip-qos-osp-00.txt", Sinnreich, et al., "AAA Usage for IP Telephony with QoS, draft-sinnreich-aaa-interdomain-sip-qos-osp-00.txt, " Internet Engineering Task Force (IETF), 20 pages, Jul. 2000.
Sinnreich, et al., "Interdomain IP Communications with QoS, Authorization and Usage Reporting, draft-sinnreich-sip-qos-osp-01.txt", Sinnreich, et al., "Interdomain IP Communications with QoS, Authorization and Usage Reporting, draft-sinnreich-sip-qos-osp-01.txt," Internet Engineering Task Force (IETF), 51 pages, Feb. 2000.
Terzis, et al., "A Prototype Implementation of the Two-Tier Architecture for Differentiated Services", Terzis, et al., "A Prototype Implementation of the Two-Tier Architecture for Differentiated Services," UCLA Computer Science Department, http://irl.cs.ucla.edu/papers/rtas99-final.pdf, eight pages, Jun. 16, 1999.
Tsaoussidis, et al., "A CORBA-based Application Service Middleware: Architecture and Implementation", 14th IEEE Symposium on Computers and Communications, IEEE ISCC '99, pp. 130-136, IEEE Computer Society Press, Red Sea, Egypt, Jul. 1999.
Wedlund, et al., "Mobility Support Using SIP", Wedlund, et al, "Mobility Support Using SIP," Association for Computing Machinery, WOWMOM '99 Proceedings of the 2nd ACM International Workshop on Wireless Mobile Multimedia, 7 pages, Aug. 20, 1999.

(56) References Cited

OTHER PUBLICATIONS

White, "RSVP and Integrated Services in the Internet: A Tutorial", White, "RSVP and Integrated Services in the Internet: A Tutorial," IEEE Communications Magazine, pp. 100-106, May 1997.

Wright, et al., "'Telephony' vs. ATM: What is There to Discuss?", 1st IEEE International Conference on ATM (ICATM-98), pp. 400-409, Jun. 22-24, 1998.

Wroclawski, "The Use of RSVP with IETF Integrated Services, Request for Comments: 2210", Wroclawski, "The Use of RSVP with IETF Integrated Services, Request for Comments: 2210," Network Working Group, MIT LCS, 29 pages, Sep. 1997.

Yavatkar, et al., "A Framework for Policy-based Admission Control (Internet Draft)", Yavatkar, et al., "A Framework for Policy-based Admission Control (Internet Draft)," Internet Engineering Task Force (IETF), pp. 1-19, Apr. 1999.

Schulzrinne, et al., "Interaction of Call Setup and Resource Reservation Protocols in Internet Telephony", Schulzrinne et al., "Interaction of Call Setup and Resource Reservation Protocols in Internet Telephony", Jun. 15, 1999, Jun. 15, 1999, 1-15.

Aiken, et al., "rfc 2768: Network Policy and Services: A Report of a Workshop on Middleware", www.ieff.org/rfc/rfc2768.txt, pp. 1-26, Feb. 2000.

Aspnes, et al., "On-Line Routing of Virtual Circuits with Applications to Load Balancing and Machine Scheduling", Journal of the ACM, vol. 44, No. 3, pp. 486-504, May 1997.

Bhuyan, et al., "Impact of switch Design on the Application Performance of Cache-Coherent Multiprocessors", http://www.cs.tamu.edu/people/ravi/IPPS98.ps.gz., pp. 1-9, 1998.

Braden, et al., "Integrated Services in the Internet Architecture: an Overview", Network Working Group, pp. 1-28, Jul. 1994.

Daniele, et al., "Textual Conventions for Internet Network Addresses", Network Working Group, Request for Comments: 2851, pp. 1-15, Jun. 2000.

Stojsic, et al., "Formal Definition of SIP Proxy Behavior", IEEE, pp. 289-292, Feb. 2001.

\* cited by examiner

Internet Protocol v.4 Header

METHOD AND SYSTEM OF PROVIDING DIFFERENTIATED SERVICES

RELATED APPLICATIONS

This application is a continuation of U.S. patent application Ser. No. 11/130,317, filed May 16, 2005, entitled "Method and System of Providing Differentiated Services", which is a continuation of U.S. patent application Ser. No. 09/435,540, filed on Nov. 8, 1999, which claims the benefit of U.S. Provisional patent application Ser. No. 60/163,913 filed on Nov. 5, 1999; the entireties of which are hereby incorporated by reference.

BACKGROUND OF THE INVENTION

1. Field of the Invention

The present invention relates generally to the field of Inters multimedia communication, and, more particularly, to a method for combining Interet protocols for session setup, teardown, authorization, and accounting in a Internet Protocol (IP) network, which uses the DiffSERV (Differentiated Services) model in order to guarantee Quality of Service (QoS).

2. Description of the Related Art

The invention of the telephone opened an unprecedented era in personal communication. At the present time, the Internet is opening up another era in personal communication, allowing a level of interactivity previously unknown between computers and groups of computers. In the future, these two services will be combined into one seamless communication medium.

However, the concepts underlying the telephone system and the Internet are fundamentally different. The telephone system is circuit-based; meaning that, for example, when a call is set up between caller and callee, a dedicated line, or circuit, is maintained between the two, and, when the call is over, the dedicated line is taken down. The Internet is packet-based; meaning that, for example, when a user downloads a web page, or receives an e-mail, the data that comprises the web page or e-mail is broken down into packets before being transmitted. The individual packets, although they form one web page or one e-mail message, may take entirely different routes between the sender and the destinations The destination computer puts all the packets together to form the web page.

A fundamental problem lies in providing a circuit-based service, such as a telephone call or videoconferencing, over a packet-based network While the answer may appear simple-digitize and packetize the audio or visual information—the situation is more complicated than it appears. For one thing, an application such as a telephone call requires a constant transmission rate; something the current Internet cannot guarantee. An application such as videoconferencing using MPEG has stringent real-time requirements in order to avoid the displayed motion appearing jerky. These requirements include a variable fission rate and very little jitter in the packet arrival times. Once again, at present the Internet cannot guarantee these requirements will be met.

One system for addressing these Quality of Service (QoS) issues on the Internet is the DiffServ model or Differentiated Services architecture (RFC 2475). In DiffServ, packet traffic shaping is implemented by network routers. In order to specify the transmission requirements, DiffServ uses the Type of Service (ToS) bits in the Internet Protocol (IP) packet header (see FIG. 1). Although the ToS field exists in the current protocol IPv4 (Internet Protocol, version 4), most routers do not use or read the bits in the ToS field. DiffServ uses these bits to tell the router the priority of the packet. Because of this, the ToS field in the IP header is referred to as the DS field.

DiffServ is implemented in the following manner: when packet traffic enters a DiffServ network, the packets are classified and possibly conditioned at the network boundary, most likely in an edge router. The DS field will be filled in with the appropriate bits for that type of traffic, which may depend on customer usage, media specification, general policy, etc. The network nodes inside the Diffserv network will read the DS field to determine how to manage incoming packets. For instance, if an edge router recognizes incoming packets as being high priority, the router will classify those packets as high priority in the DS field, and then send those packets inside the network. When those high priority packets reach a network node, the node will forward them before other packets, because the DS field indicates that they are high priority. This example is somewhat of a simplification, for the DS field classification scheme is more complicated than merely high or low priority, and takes into account throughput, delay, jitter, packet loss, and other traffic characteristics. Taken together, these traffic characteristics make up Quality of Service (QoS).

Because DiffServ classifies these packets into different categories, it works only upon "flow aggregates," which refers to a collection of packet flows. In other words, an interior network node does not know what a packet contains or if that packet is part of a series of packets; the interior node merely treats it as a member of a certain classification of traffic characteristics. This is in contrast to another method of assuring QoS over a network, the Resource ReSerVation Protocol (RSVP). RSVP sets up a path from network node to network node for a particular packet flow. For example, if an end client device wishes to establish a telephone call over the network, the device would use RSVP to establish a path to the callee's end client device through one or more network nodes. The individual network nodes on the path would then know that a particular identified packet flow will require certain traffic conditions, and resources will be reserved for them. When a node receives one of the packets in the series of packets, the node will recognize it and behave accordingly. While DiffServ looks at flow aggregates, RSVP looks at individual "micro-flows."

For the rest of this description, a DiffServ environment will be assumed. This means that the QoS requirements will be handled by edge routers which will tag individual packets appropriately, while interior network nodes will act upon packets based merely on their DS field.

Even assuming the QoS problems are being handled by DiffServ, there are other services automatically handled in a circuit-based environment which are problematic in an IP-based network. A call has to be set up, establishing a connection between the two end devices, and the resources used in an individual call or session must be tracked, for accounting purposes. In addition, there needs to be the capability to have only authorized sessions or calls from authenticated users. In the Internet framework, these issues are resolved by different protocols that do different things. Although these individual protocols have been developed in detail, there is at present known method that sets forth how to use them together in a consistent way across the Internet.

Thus, there is a need for linking these protocols together in a consistent and workable way. In particular, there is a need for a method providing an interchange of parameters among protocols between session setup, authorization, policy, and usage reporting that will support IP communications between Internet Service Providers (ISPs), enterprise networks, and individual clients.

SUMMARY OF THE INVENTION

The present invention provides a method for providing an interchange of parameters among protocols for session setup, teardown, authorization, policy, and usage reporting that will support IP communications in a Differentiated Services model environment.

The present invention provides a method for session or call setup, teardown, authorization, policy and usage reporting in a common way of usage, thereby supporting IP communications across the Internet.

The present invention also provides a method to link together the Session Initiation Protocol (SIP), Common Open Policy Service (COPS), and Open Settlement Policy (OSP) in a Differentiated Services model environment.

These and other objects are achieved by the preferred embodiment of the present invention. In the preferred embodiment, the messages from the Session Initiation Protocol (SIP), Common Open Policy Service (COPS), and Open Settlement Policy (OSP) are interwoven so that session setup, authorization, policy, and usage reporting are all performed concurrently, in one unified sequence of messages. Likewise, the messages from the Session Initiation Protocol (SIP), Common Open Policy Service (COPS), and Open Settlement Policy (OSP) are interwoven so that session teardown, authorization, policy, and usage reporting are all performed concurrently, in one unified sequence of messages.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

As stated above, in the prior art there has been no linkage between the individual protocols that provide for call setup, authorization, accounting, and authentication. These steps are taken care of by the following protocols:

Session Initiation Protocol (SIP)—for setting up connections or calls;

Common Open Policy Service (COPS)—for policy deployment in network elements; and Open Settlement Protocol (OSP)—for authorization and usage reporting.

These protocols will be discussed in detail below. In these discussions, the terms "client" and "server" will be used in their abstract functional sense, as processes that may be implemented in any sort of device. This means, of course, that some servers and clients may be running in the same device.

a) Session Initiation Protocol (SIP)

SIP is a signaling protocol that allows for initiating and tearing down connections. There are two components in a SIP system: network servers and user agents. A user agent is an end system that acts on behalf of someone who wants to participate in cats. In general, the user agent contains both a protocol client (a user agent client UAC) which initiates a call and a protocol server (user agent server UAS) which responds to a call (see FIG. 2). There are two different type of network servers as well: a proxy server, which receives requests, determines which server to send it to, and then forwards the request; and a redirect server, which receives requests, but instead of forwarding them to the next hop server, tells the client to contact the next hop directly.

Figure 1:
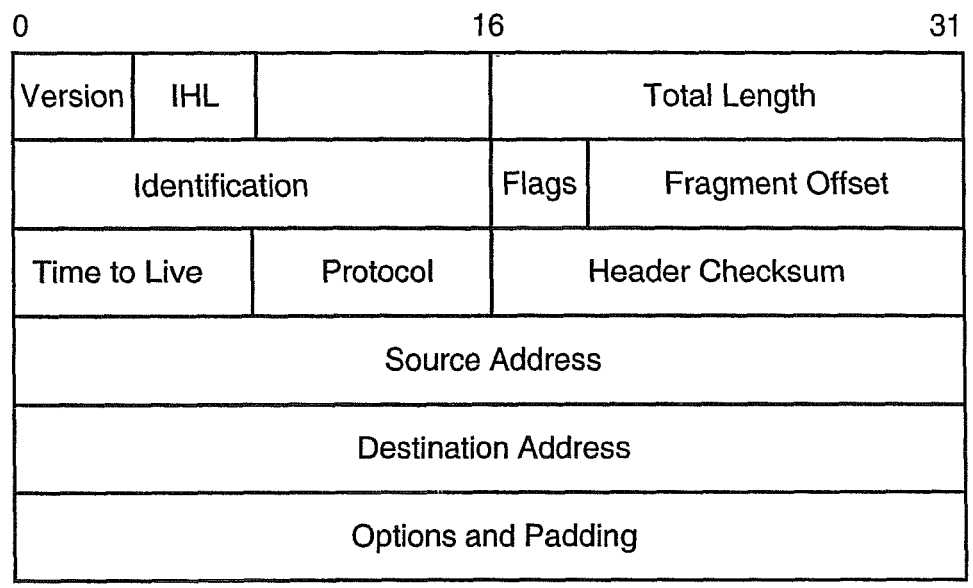
FIG. 1 shows an Internet Protocol Header.
Figure 2:
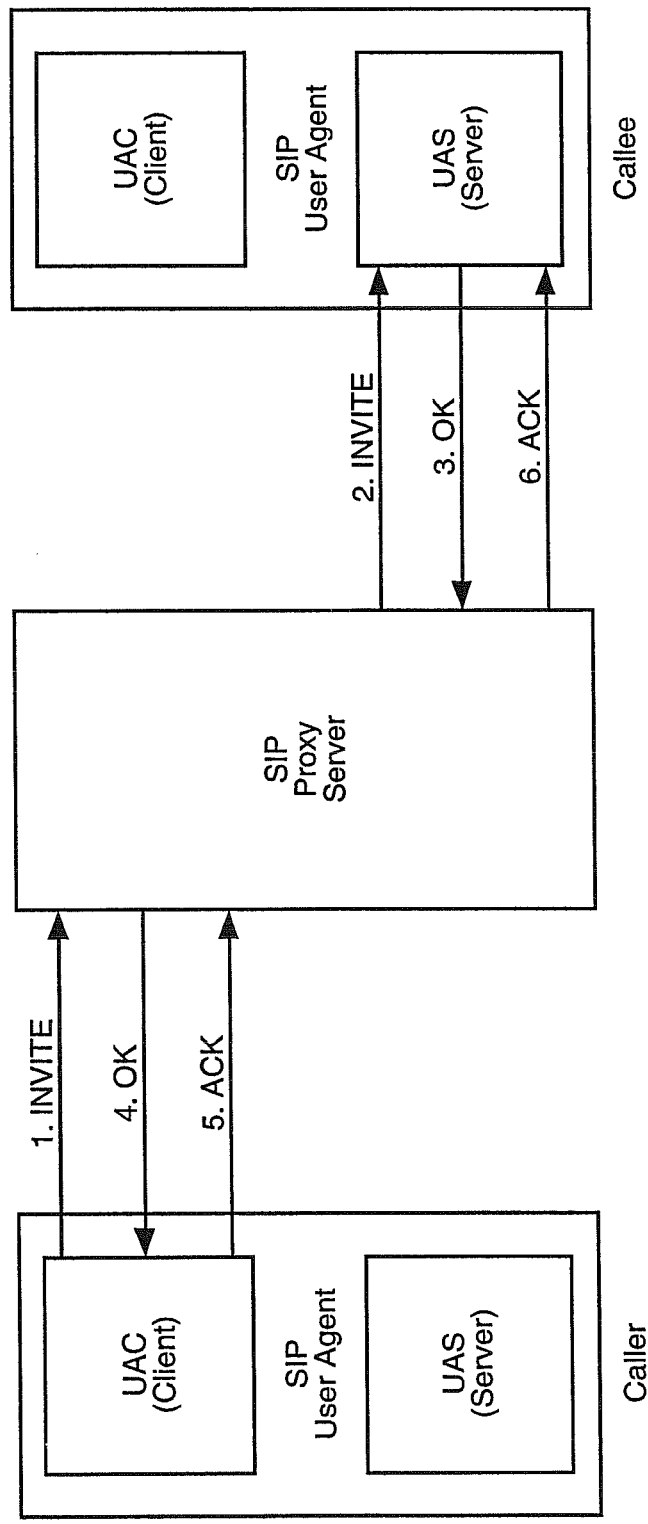
FIG. 2 shows the components of a SIP-based network and an overview of initiating a session.

The steps in initiating a session are fairly simple: as shown in FIG. 2, (1) the UAC sends an INVITE request to a SIP server, which in this case, is a proxy server. The proxy server will look in its database to determine where to send the INVITE request Once that is determined, the proxy server sends the INVITE message to the appropriate next hop. In FIG. 1, the next hop is the callee, but, in reality, there could be a number of hops between the proxy server and the callee. If the proxy server is a redirect server, it would inform the UAC what the appropriate next hop is, and let the UAC do the rest. Once (2) the INVITE message finally reaches the callee UAS, (3) the callee UAS responds with an OK message, which (4) is forwarded to the caller UAC. When the caller UAC receives the OK message, indicating the callee has received the INVITE, (5) the UAC sends an ACK message, which, when (6) received, will start the session.

The steps in terminating a session, or teardown, are even more simple: the UAC sends a BYE message, and the UAS sends a message indicating receipt of the BYE message. In SIP, either the UAC or the UAS may send the BYE message terminating a session.

b) Common Open Policy Service (COPS)

Figure 3:
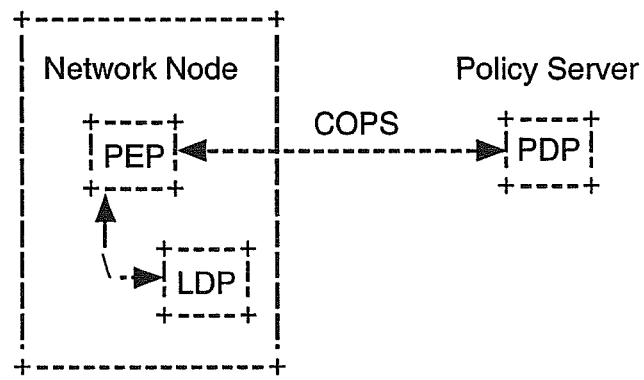
FIG. 3 shows the components of a Common Open Policy Service (COPS) system.

COPS is a simple query and response protocol that can be used to exchange information between a policy server (Police Vision Point or PDP) and its clients (Policy Enforcement) Points or PEPs), as shown in FIG. 3. A policy is a combination of rules and services that define the criteria for resource access and usage. In COPS the PEP sends requests, updates, and deletions to the PDP and the PDP returns decisions back to the PEP. The basic message formats for COPS include Requests (REQs), Decisions (DECs), and Report States (RPTs), among many others.

When particular events occur at a PEP, such as the initiation of a session, the PEP will send a REQ to the PDP to determine the policy regarding the session. The REQ may be an Authentication, Authorization Accounting (AAA) REQ, which is asking that the session be authorized, authenticated, and kept track of for accounting purposes. If the PDP determines the session fits the AAA policy, the PDP will send its decision DEC to the PEP. thus allowing the PEP to allocate the needed resources. The RPT message is used by the PEP to communicate to the PDP its success or failure in carrying out the PDP's decision, or to report an accounting related change in state.

c) Open Settlement Protocol (OSP)

Figure 4:
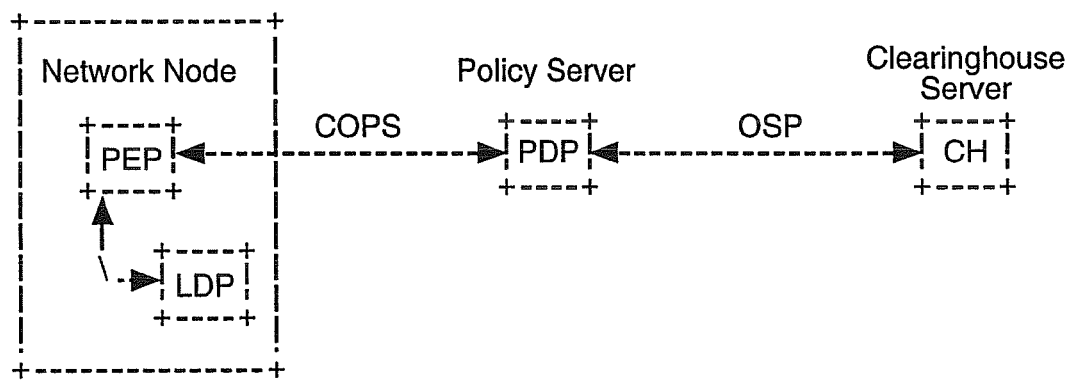
FIG. 4 shows the components of a Open Settlement Protocol (OSP) system.

OSP is used when there is a central clearinghouse for certain policy decisions. As shown in FIG. 4, OSP is the protocol describing communication between the policy server PDP and the clearinghouse server. This is needed in large networks which require multiple policy servers. Among other things, authorization for QoS levels is handled by the clearinghouse server. The clearinghouse server can also be a trust broker between a large number of network providers and the collecting place for usage reports. As an example, if a PEP sends a REQ AAA to a PDP, the PDP sends a message to the clearinghouse server in order to authorize the call or session. This message is in the form of a <AuthReq>, and the clearinghouse server responds with a <Autbksp>, which may or may not contain an authorization token, which permits the REQ AAA to proceed. In addition, when a connection or session ends, the use of resources for that session or connection must be recorded for accounting purposes. When the policy server PDP de-installs a particular QoS policy, i.e. registers the end of a session, the policy server PDP sends a <UsageInd> message to the clearinghouse server so that the resource usage is recorded as well as monitored. The clearinghouse confirms the <UsageInd> with a <UsageCnf>.

As stated above, these protocols have been extensively defined and implemented, but to date there has been no common way of usage for combining them. A preferred embodiment of the present invention, as described below, combines these protocols in order to provide a consistent and common manner of usage for IP-based networks using the Differentiated Services model. In the description below of FIG. 5, a session setup according to the preferred embodiment of the invention will be explained in detail. In the description below of FIG. 6, a session teardown will be explained in detail.

Figure 5:
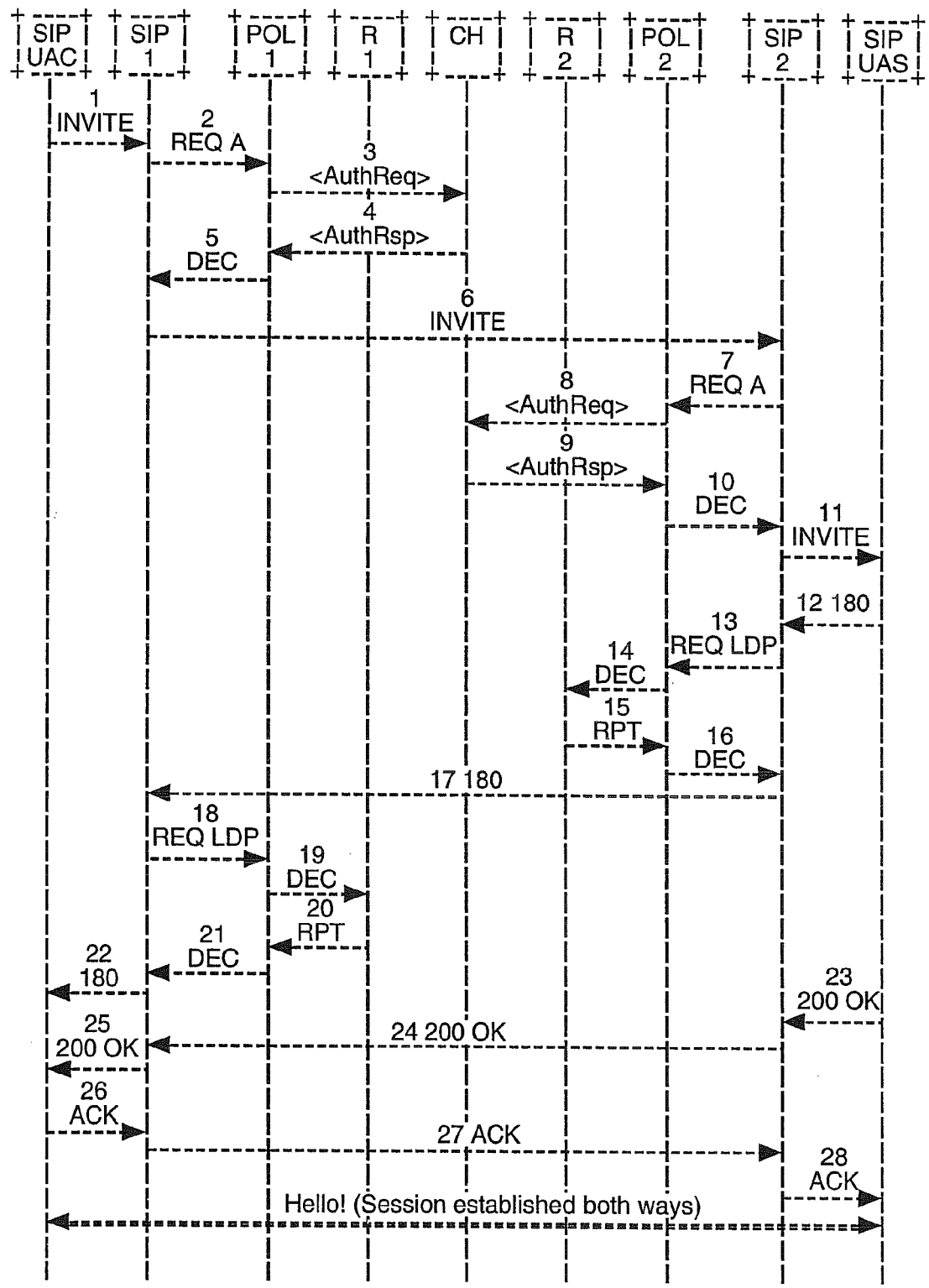
FIG. 5 shows a session initiation setup according to an embodiment of the present invention.

Referring to FIG. 5, at the origination end, there is a SIP user agent client UAC which is attempting to start a session, and the UAC has a local SIP proxy server SIP1, a local Policy server POL1, and a local Router R1. At the destination end, there is a SIP user agent server UAS, which the UAC is attempting to call, and the UAS has local SIP proxy server SIP2, a local Policy server POL2, and a local Router R2. Both the UAS and UAC share the same Clearinghouse CH, shown in the middle. Both POL1 and POL2 are acting as PDPs, and SIP1 and SIP2 are their corresponding PEPs. In the preferred embodiment, when the Clearinghouse sends a positive response to a resource usage request, the Clearinghouse also sends an authorization token. The unit receiving the call is the SIP user agent server UAS, which may be running in any type of IP telephone, computer, media device, or gateway. As stated above, both routers R1 and R2 are working based on the DiffServ model. Therefore, the routers will enforce QoS by altering the DS field in incoming session packets.

In general, the call setup request, authorization and policy installation occur as follows:

1) The UAC sends an INVITE message requesting call setup to SIP1;
2) SIP1 sends a REQ AAA message requesting authentication, authorization, and accounting for the UAC SIP session to the local policy server POL1;
3) Local policy server POL1 sends a <AuthReq> message to the clearinghouse server CH;
4) The Clearinghouse server CH responds with a <Auth> authorizing the session and sending an authorization token to POL1;
5) POL1 sends a DEC message to SIP1, authorizing installation of the session;
6) SIP1 now forwards the INVITE message to SIP2;
7) SIP2 sends a REQ AAA message requesting authentication, authorization, and accounting for the SIP session to the local policy server POL2;
8) Local policy server POL2 sends a <AuthReq> message to the clearinghouse server CH;
9) The clearinghouse server CH responds with a <AuthRsp> authorizing the session and sending an authorization token to POL2;
10) POL2 sends a DEC message to SIP2, authorizing installation of the session;
11) SIP2 now forwards the INVITE message to user agent server UAS;
12) UAS responds with a 180 RINGING message, which means the UAS is alerting the user to the session;
13) SIP2 sends a REQ LDP message to POL2. This message requests that the appropriate policy be loaded onto R2 concerning this session; it is a local decision point (LDP) message, because the local policy server POL2 will make this decision, not the clearinghouse;
14) POL2 sends a DEC message to R2, telling R2 of the appropriate policy for the session packets. Since this is a DiffServ environment, router R2 will enable QoS by filling in the DS field of the session packets appropriately when they arrive at the router R2;
15) R2 responds with a RPT message indicating that the policy was installed
16) POL2 informs SIP2 with a DEC message to install the same policy;
17) SIP2 now forwards the 180 RINGING message to SIP1;
18) SIP1 sends a REQ LDP message to POL1. This message requests that the appropriate policy be loaded onto R1 concerning this session; it is a local decision point (LDP) message, because the local policy server POL1 will make this decision, not the clearinghouse;
19) POL1 sends a DEC message to R1, telling R1 of the appropriate policy for the session packets. Since this is a DiffServ environment, router R1 will enable QoS by filling in the DS field of the session packets appropriately when they arrive at the router R1;
20) R1 responds with a RPT message indicating that the policy Was installed;
21) POL1 informs SIP1 with a DEC message to install the same policy;
22) SIP1 now forwards the 180 RINGING message to UAC:
23) UAS responds with a 200 OK message;
24) SIP2 forwards this message to SIP1;
25) SIP1 forwards this message to UAC;
26) UAC acknowledges with an ACK message;
27) SIP1 forwards the ACK message to the SIP2;
28) SIP2 forwards the ACK message to UAS;
29) The session or connection commences.

The actual sequence of messages is divided between the three protocols: message steps 1, 6, 11, 12, 17, and 22-9 are SIP messages; message steps 2, 5, 7, 10, 13-16, 18-21 are COPS messages; and message steps 3-4 and 89 are OSP messages. In this manner, the preferred embodiment of the present invention links the three protocols for call setup, authorization, and accounting. Although the above sequence has been described with a clearinghouse server, the preferred embodiment can work in a system without a clearinghouse. In such a network, the policy server handles most of the clearinghouse tasks, and message steps 3-4 and 8-9 would take place inside the policy server.

Figure 6:
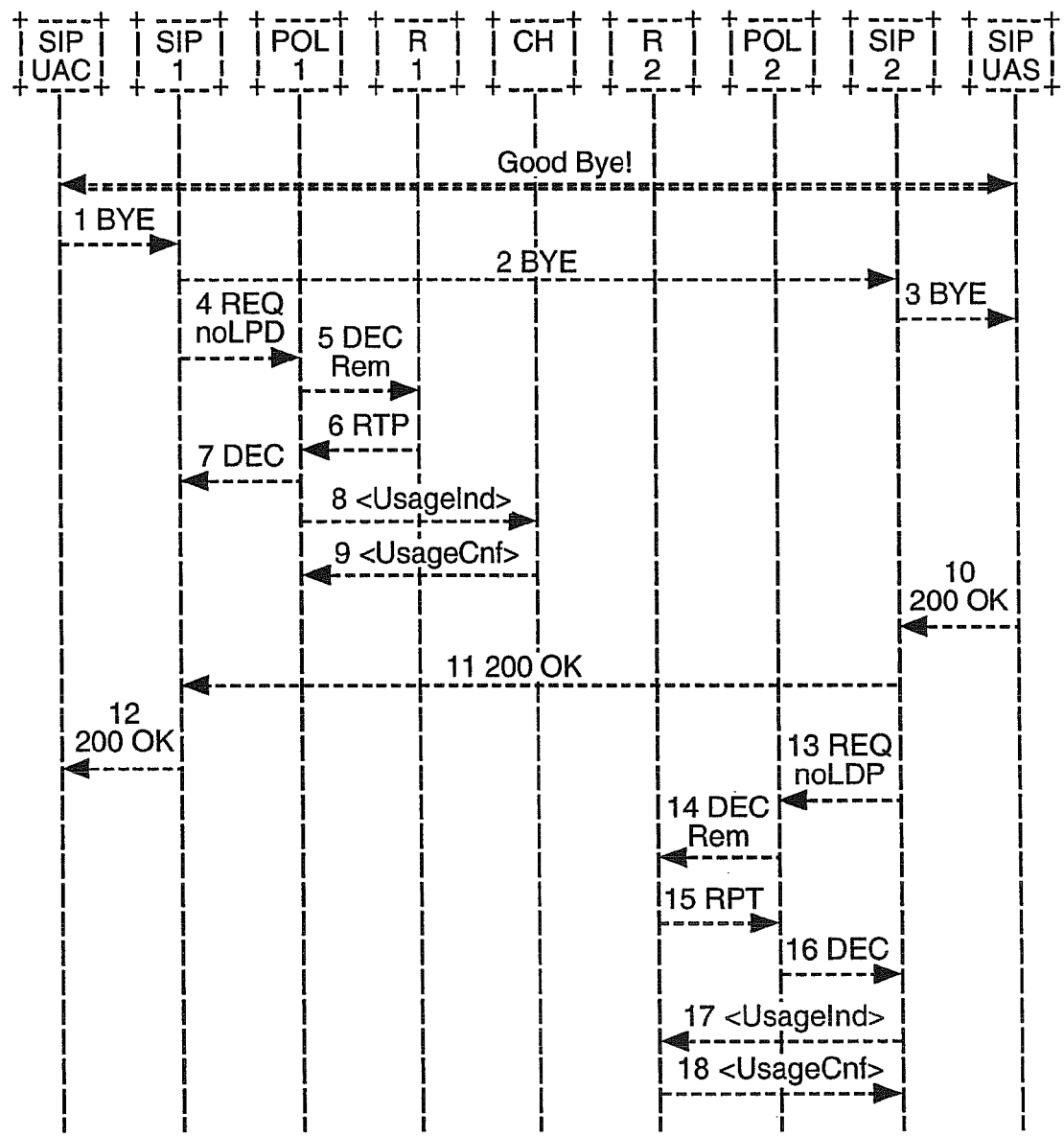
FIG. 6 shows a session teardown according to an embodiment of the present invention.

FIG. 6 shows the steps of a session teardown according to an embodiment of the present invention. The preferred embodiment also links together the protocols when ending a session, as shown in the following sequence of steps:

1) UAC signals the end of the session with a BYE message;
2) SIP1 forwards the BYE message to SIP2;
3) SIP2 forwards the BYE message to UAS;
4) SIP1 sends a REQ noLDP message canceling the policy given in the original REQ LDP message in message step 18 of the setup message sequence above;
5) POL1 sends a DEC Remove message to R1, telling the router to de-install the policy. Since this is a DiffServ environment, the router, up to this point, has been altering the DS field in each of the session packets that arrived. Now, the router will de-install that policy, and stop looking for this session's packets;
6) R1 confirms the policy de-installation with a RPT message to POLL;
7) POL1 sends a DEC message to SIP1, telling the server to de-install the policy;
8) POL1 sends a <Usageind> message detailing the resource usage to clearinghouse CH;
9) CH confirms with a <UsageCnf> message;
10) UAS sends a 200 OK message confing receipt of the BYE message;
11) SIP2 forwards the OK message to SIP1;
12) SIP1 forwards the OK message to UAC;
13) SIP2 sends a REQ noLDP rage canceling Me policy given in the original REQ LDP message in step 13 of the setup message sequence above;
14) POL2 sends a DEC Rem message to R2, telling the router to de-install the policy. Since this is a DiffServ environment the router, up to this point, has been altering the DS field in each of the session packets that arrived. Now, the router will de-install that policy, and stop looking for this session's packets;
15) R2 confirms the policy de-installation with a RPT message to POL2;
16) POL2 sends a DEC message to SIP2, telling the server to de-install the policy;
17) POL2 sends a <UsageInd> message detailing the resource usage to CH; and
18) CH confirms with a <UsageCnf> message;

As with the setup message sequence described above, the actual sequence of messages is divided between the three protocols: message steps 1, 6, 11, 12, 17, and 22-9 are SIP messages; message steps 2, 5, 7, 10, 13-16, 18-21 are COPS messages; and message steps 3-4 and 8-9 are OSP messages. In this manner, the preferred embodiment of the present invention links the three protocols for call tear-own and usage reporting. Although this has been described with a clearinghouse server, the preferred embodiment can work in a system without a clearinghouse. In such a network, the policy server handles most of the clearinghouse tasks, and message steps 3-4 and 8-9 would take place inside the policy server.

While an embodiment of the present invention has been shown and described, it is to be understood that many changes and modifications may be made thereunto without departing from the spirit and scope of the invention as defined in the appended claims.

What is claimed is:

1. A method comprising:
   receiving a message, according to a policy protocol, for authentication, authorization, and accounting corresponding to a call to be established over a data network, wherein the call is to be established in accordance with a signaling protocol for connection setup and teardown; and
   generating, in response to the received message, an authentication request according to a settlement protocol for transmission to a clearinghouse server configured to authorize the call for a particular quality of service (QoS) policy,
   wherein the settlement protocol includes Open Settlement Policy (OSP), the policy protocol includes Common Open Policy Service (COPS), and the signaling protocol includes Session Initiation Protocol (SIP).

2. A method according to claim 1, further comprising:
   retrieving the QoS policy; and
   establishing a communication session with a router to provide the QoS policy to the router.

3. A method according to claim 2, wherein the router is configured to operate according to a differentiated services (DS) environment, and to set a DS field according to the QoS policy.

4. A method according to claim 1, further comprising:
   initiating the transmission of the authentication request according to the settlement protocol to the clearinghouse server; and
   receiving an authorization token from the clearinghouse server.

5. A method according to claim 1, further comprising:
   generating a decision message, according to the COPS, for transmission to a proxy server configured to generate the received message, wherein the decision message instructs the proxy server to install the QoS policy.

6. An apparatus comprising:
   at least one processor; and
   at least one memory including computer program code,
   the at least one memory and the computer program code, with the at least one processor, configuring the apparatus to perform at least the following,
   receive a message, according to a policy protocol, for authentication, authorization, and accounting corresponding to a call to be established over a data network, wherein the call is to be established in accordance with a signaling protocol for connection setup and teardown, and
   generate, in response to the received message, an authentication request according to a settlement protocol for transmission to a clearinghouse server configured to authorize the call for a particular quality of service (QoS) policy,
   wherein the settlement protocol includes Open Settlement Policy (OSP), the policy protocol includes Common Open Policy Service (COPS), and the signaling protocol includes Session Initiation Protocol (SIP).

7. An apparatus according to claim 6, wherein the apparatus is further configured to:
   retrieve the QoS policy; and
   establish a communication session with a router to provide the QoS policy to the router.

8. An apparatus according to claim 7, wherein the router is configured to operate according to a differentiated services (DS) environment and to set a DS field according to the QoS policy.

9. An apparatus according to claim 6, wherein the apparatus is further configured to:
   initiate the transmission of the authentication request according to the settlement protocol to the clearinghouse server; and
   receive an authorization token from the clearinghouse server.

10. An apparatus according to claim 6, wherein the apparatus is further configured to:
generate a decision message, according to the COPS, for transmission to a proxy server configured to generate the received message, wherein the decision message instructs the proxy server to install the QoS policy.

11. A system comprising:
a processor;
a policy server configured to receive a message, according to a policy protocol, for authentication, authorization, and accounting corresponding to a call to be established over a data network, wherein the call is to be established in accordance with a signaling protocol for connection setup and teardown; and
a clearinghouse server configured to authorize, by the processor, the call for a particular quality of service (QoS) policy,
wherein the policy server is further configured to generate, in response to the received message, an authentication request according to a settlement protocol for transmission to the clearinghouse server, and
wherein the settlement protocol includes Open Settlement Policy (OSP), the policy protocol includes Common Open Policy Service (COPS), and the signaling protocol includes Session Initiation Protocol (SIP).

12. A system according to claim 11, wherein the policy server is further configured to retrieve the QoS policy, the system further comprising:
a router configured to establish a communication session with the policy server to acquire the QoS policy.

13. A system according to claim 12, wherein the router is configured to operate according to a differentiated services (DS) environment, and to set a DS field according to the QoS policy.

14. A system according to claim 11, wherein the policy server is further configured to initiate the transmission of the authentication request according to the settlement protocol to the clearinghouse server, and to receive an authorization token from the clearinghouse server.

15. A system according to claim 11, further comprising:
a proxy server configured to generate the received message,
wherein the policy server is further configured to generate a decision message, according to the COPS, for transmission to the proxy server, wherein the decision message instructs the proxy server to install the QoS policy.

16. A system according to claim 15, further comprising:
another proxy server configured to communicate with the proxy server to establish the call using the signaling protocol.

17. A system according to claim 16, further comprising:
another policy server configured to communicate, according to the policy protocol, with the clearinghouse server to obtain the authentication, authorization, and accounting for the call.

* * * * *